United States Patent
Levi et al.

(10) Patent No.: US 10,880,236 B2
(45) Date of Patent: Dec. 29, 2020

(54) SWITCH WITH CONTROLLED QUEUING FOR MULTI-HOST ENDPOINTS

(71) Applicant: Mellanox Technologies TLV Ltd., Raanana (IL)

(72) Inventors: Lion Levi, Yavne (IL); Eitan Zahavi, Zichron Yaakov (IL); Amiad Marelli, Herzliya (IL); George Elias, Tel Aviv (IL); Liron Mula, Ramat Gan (IL); Oded Zemer, Tel Aviv (IL); Sagi Kuks, Ramat Gan (IL); Barak Gafni, Campbell, CA (US); Gal Shohet, Yavne (IL); Harold Rosenstock, Boxborough, MA (US)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 118 days.

(21) Appl. No.: 16/163,585

(22) Filed: Oct. 18, 2018

(65) Prior Publication Data
US 2020/0127946 A1    Apr. 23, 2020

(51) Int. Cl.
*H04L 12/861*    (2013.01)
*H04L 12/741*    (2013.01)
(Continued)

(52) U.S. Cl.
CPC .......... *H04L 49/90* (2013.01); *H04L 45/745* (2013.01); *H04L 49/3027* (2013.01); *H04L 2012/5678* (2013.01)

(58) Field of Classification Search
CPC .............. H04L 49/90; H04L 45/745; H04L 2012/5678; H04L 49/3027
See application file for complete search history.

(56) References Cited

U.S. PATENT DOCUMENTS

| 7,190,696 | B1 | 3/2007 | Manur et al. |
| 7,245,627 | B2 | 7/2007 | Goldenberg et al. |

(Continued)

OTHER PUBLICATIONS

Gafni et al., U.S. Appl. No. 15/713,776 filed Sep. 27, 2017.
(Continued)

*Primary Examiner* — Walter J Divito
*Assistant Examiner* — Anthony Luo
(74) *Attorney, Agent, or Firm* — Kligler & Associates Patent Attorneys Ltd

(57) ABSTRACT

Communication apparatus includes multiple ports configured to serve as ingress and egress ports, such that the ingress ports receive packets from a packet data network for forwarding to respective egress ports. The ports include an egress port configured for connection to a network interface controller (NIC) serving multiple physical computing units, which have different, respective destination addresses and are connected to the NIC by different, respective communication channels. Control and queuing logic is configured to queue the packets that are received from the packet data network for forwarding to the multiple physical computing units in different, respective queues according to the destination addresses, and to arbitrate among the queues so as to convey the packets from the queues via the same egress port to the NIC, for distribution to the multiple physical computing units over the respective communication channels.

14 Claims, 4 Drawing Sheets

(51) Int. Cl.
*H04L 12/70* (2013.01)
*H04L 12/935* (2013.01)

(56) References Cited

U.S. PATENT DOCUMENTS

| | | |
|---|---|---|
| 8,004,990 B1 | 8/2011 | Callon |
| 8,478,907 B1 | 7/2013 | Aloni et al. |
| 8,644,140 B2 | 2/2014 | Bloch et al. |
| 9,019,962 B1 | 4/2015 | Ghosh |
| 9,853,900 B1 | 12/2017 | Mula et al. |
| 10,116,567 B1 | 10/2018 | Singh et al. |
| 2008/0181103 A1 | 7/2008 | Davies et al. |
| 2011/0161626 A1* | 6/2011 | Mangione-Smith ......... H04L 47/823 712/29 |
| 2012/0163389 A1 | 6/2012 | Zhang et al. |
| 2013/0039169 A1 | 2/2013 | Schlansker et al. |
| 2013/0201989 A1 | 8/2013 | Hu et al. |
| 2013/0279503 A1 | 10/2013 | Chiabaut |
| 2013/0308444 A1 | 11/2013 | Sem-Jacobsen et al. |
| 2014/0129741 A1 | 5/2014 | Shahar et al. |
| 2014/0215077 A1* | 7/2014 | Soudan ................... H04L 47/11 709/226 |
| 2015/0163146 A1 | 6/2015 | Zhang et al. |
| 2015/0281082 A1 | 10/2015 | Rajahalme |
| 2015/0372916 A1* | 12/2015 | Haramaty ............... H04L 45/24 370/392 |
| 2016/0134535 A1 | 5/2016 | Callon |
| 2016/0294696 A1* | 10/2016 | Gafni ..................... H04L 47/10 |
| 2017/0048144 A1 | 2/2017 | Liu |
| 2017/0070425 A1 | 3/2017 | Mithyantha |
| 2017/0085630 A1 | 3/2017 | Luo et al. |
| 2017/0201469 A1 | 7/2017 | Elias et al. |
| 2018/0083866 A1* | 3/2018 | Gobriel ................. H04L 45/02 |
| 2018/0176818 A1* | 6/2018 | Parron ............. H04W 28/0284 |
| 2019/0342225 A1* | 11/2019 | Sanghi ................ H04L 47/6205 |

OTHER PUBLICATIONS

Mula et al., U.S. Appl. No. 15/810,065 filed Nov. 12, 2017.
"PCI Express® Base Specification," Revision 4.0, version 1.0, 1293 pages, Sep. 27, 2017.
U.S. Appl. No. 15/713,776 office action dated Jan. 11, 2019.

* cited by examiner

SWITCH WITH CONTROLLED QUEUING FOR MULTI-HOST ENDPOINTS

FIELD OF THE INVENTION

The present invention relates generally to packet communication networks, and particularly to methods and apparatus for forwarding of packets in such networks.

BACKGROUND

Most network interface controllers (NICs) are designed to connect a single physical computing unit to a packet communication network, such as an Ethernet or InfiniBand network. (In InfiniBand specifications, the NIC is commonly referred to as a "host channel adapter," or HCA.) The term "physical computing unit," as used in the context of the present description and in the claims, refers to a distinct computer hardware component, such as an integrated circuit chip or chip set or a printed circuit board, which is capable of performing computing functions independently of other physical computing units. Physical computing units of this sort include, but are not limited to, host computers and central processing units (CPUs), which are also referred to simply as "hosts," as well as special-purpose functional components.

A typical NIC comprises a network interface, comprising one or more ports, which transmit and receive data packets to and from the network, and a host interface, which connects the NIC via a communication channel to a physical computing unit. For example, the host interface may comprise a PCI Express® (PCIe®) interface, which connects to the internal bus of a host computer. Packet processing circuitry between the network and host interfaces passes incoming data packets from the network to the host computer and transmits outgoing data packets from the host computer to the network.

Some NICs are designed to serve multiple host computers concurrently. Such NICs are sometimes referred to as multi-host NICs. For example, U.S. Pat. No. 7,245,627 describes a network interface device that includes a fabric interface, adapted to exchange messages over a switch fabric with a plurality of host processors, and a network interface, including one or more ports adapted to be coupled to a network external to the switch fabric. Message processing circuitry coupled between the fabric interface and the network interface enables at least first and second host processors to use a single one of the ports substantially simultaneously so as to transmit and receive data frames over the network.

As another example, U.S. Pat. No. 8,478,907 describes a network interface device that is designed to serve multiple host operating systems. This patent describes a NIC that is configured to permit the resources of the NIC, including wire-speed protocol offload processing, to be shared among multiple host computers and/or master and virtual operating systems running on the same computer.

Still another example is presented in U.S. Patent Application Publication 2014/0129741, which describes a PCI Express device that serves multiple hosts, and specifically shows a NIC that connects two hosts simultaneously to a communication network. The resources of the device, such as the communication bandwidth of the NIC, are allocated to the various hosts as appropriate.

SUMMARY

Embodiments of the present invention that are described hereinbelow provide improved apparatus and methods for switching data packets in a network.

There is therefore provided, in accordance with an embodiment of the invention, communication apparatus, including multiple ports configured to serve as ingress and egress ports, such that the ingress ports receive packets from a packet data network for forwarding to respective egress ports. The ports include an egress port configured for connection to a network interface controller (NIC) serving multiple physical computing units, which have different, respective destination addresses and are connected to the NIC by different, respective communication channels. Control and queuing logic is configured to queue the packets that are received from the packet data network for forwarding to the multiple physical computing units in different, respective queues according to the destination addresses, and to arbitrate among the queues so as to convey the packets from the queues via the same egress port to the NIC, for distribution to the multiple physical computing units over the respective communication channels.

Typically, the communication channels have respective bandwidths, and the control and queuing logic is configured to limit a rate of transmission of the packets from each of the queues via the egress port responsively to the respective bandwidths. In a disclosed embodiment, the egress port has a first bandwidth, and a respective communication channel between the NIC and one of the physical computing units has a second bandwidth that is less than the first bandwidth, and the control and queuing logic is configured to select the packets for transmission from the queues so as to maintain the rate of transmission of the packets through the egress port to the one of the physical computing units at a level that is no greater than the second bandwidth.

In one embodiment, the control and queuing logic is configured, upon receiving the packets from the ingress ports, to perform a first lookup on the destination addresses in order to select the respective egress ports through which the packets are to be transmitted, and upon determining that a given packet is to be transmitted through an egress port that is connected to the NIC serving the multiple physical computing units, to perform a second lookup on a destination address of the given packet in order to assign the given packet to a respective one of the queues.

The different, respective destination addresses of the physical computing units may be network-layer addresses and/or link-layer addresses.

In some embodiments, the control and queuing logic is configured to monitor respective lengths of the queues, and when a length of one of the queues corresponding to a given destination address of one of the physical computing units exceeds a predefined threshold, to apply a congestion control measure with respect to the given destination address.

Additionally or alternatively, the apparatus includes a memory, which is coupled to store the packets received from the ingress ports while awaiting transmission through the egress ports, wherein the control and queuing logic is configured to allocate different, respective buffers in the memory for the packets in the different, respective queues that are destined for the multiple physical computing units. In one embodiment, the control and queuing logic is configured to monitor respective lengths of the queues and to adjust respective allocations of the buffers in the memory responsively to the lengths of the queues.

There is also provided, in accordance with an embodiment of the present invention, a method for communication, which includes receiving from a packet data network, via ingress ports of a switch, packets for forwarding to respective egress ports, including an egress port connected to a network interface controller (NIC) serving multiple physical computing units, which have different, respective destination addresses and are connected to the NIC by different, respective communication channels. The packets that are received from the packet data network are queued for forwarding to the multiple physical computing units in different, respective queues according to the destination addresses. Arbitration is performed among the queues so as to convey the packets from the queues via the same egress port to the NIC, for distribution to the multiple physical computing units over the respective communication channels.

The present invention will be more fully understood from the following detailed description of the embodiments thereof, taken together with the drawings in which:

DETAILED DESCRIPTION OF EMBODIMENTS

Overview

Figure 1:
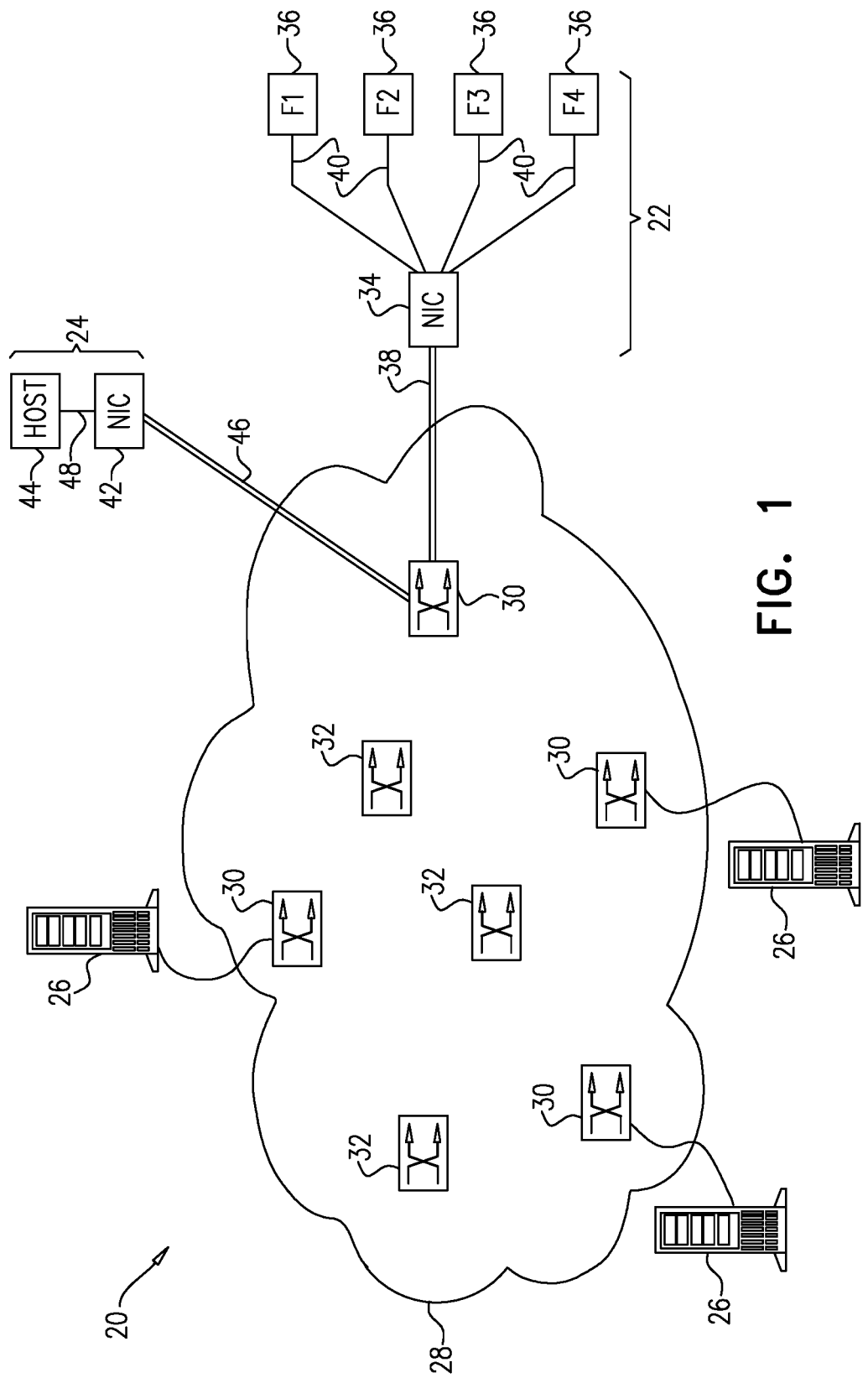
FIG. 1 is a block diagram that schematically illustrates a network communication system, in accordance with an embodiment of the invention.

In multi-host architectures, such as those described above in the Background section, a single NIC serves multiple physical computing units, which are connected to the NIC by different, respective communication channels. Such a "communication channel" may comprise, for example, a host bus, such as a PCIe bus, or a set of one or more lanes within such a bus, or alternatively any other suitable type of data connection. Ideally, to prevent traffic bottlenecks, the network and host interfaces of the NIC are designed so that the host interface has a bandwidth that is at least equal to that of the network interface. (The terms "bandwidth" and "data rate" are used interchangeably in the context of the present description and in the claims to mean the number of bits per second that are conveyed or can be conveyed through a given communication channel, interface, or other data link.) In a multi-host NIC, the host interface bandwidth is divided among the communication channels that serve the different physical computing units, and the respective bandwidths of these individual communication channels may therefore be less than the bandwidth of the network interface of the NIC (depending on the respective bandwidths of the host and network interfaces).

The network interface of the NIC is typically connected to one or more of the ports of a switch in a packet network, which transmits packets to and receives packet from the NIC. In networks that are known in the art, when the switch receives a large flow of packets from the network that are directed to one of a number of physical computing units served by the NIC with the same service level, the switch will typically attempt to forward the packets through the appropriate port at the full "wire speed" of the network connection, while complying with the limitations of the quality of service configuration. (The quality of service configuration applies to all of the physical computing units using the network connection). The communication channel connecting the NIC to the destination physical computing unit, however, may not have sufficient bandwidth to receive the flow, and the NIC will generally not have sufficient memory to buffer the excess packets that may accumulate due to this bandwidth mismatch.

Under such circumstances, the NIC will either have to drop the excess packets or signal to the switch that the transmission rate of packets through the port should be reduced, using flow control techniques that are known in the art. Reducing the transmission rate will solve the problem of packet delivery to this particular destination physical computing unit, but it will also impede delivery of packets to other physical computing units served by the same NIC. In particular, in a lossless network, packets for delivery to other physical computing units will be blocked until the earlier packets to the particular destination physical computing unit have been delivered. Due to this blockage, the rate of packet traffic to the other physical computing units will be reduced, and packets may be dropped, thus reducing the efficiency of use of available communication and computing resources. Although it might be possible in some cases to mitigate this problem of traffic blocking by assigning the traffic destined to each of the multiple physical computing units to a different class of service, this solution complicates the design of network applications and is not scalable to large systems with many multi-host NICs.

Embodiments of the present invention that are described herein address this problem by making the switch "aware" that one or more of its egress ports are connected to multi-host NICs, and enabling the switch to separately queue and forward packets that are destined to each of the different physical computing units served by the NIC. The switch can then limit the rate of transmission from each queue so that the volume of data transmitted from the switch to the NIC will not exceed the bandwidth of the respective communication channel to the physical computing unit in question. The remaining bandwidth of the network interface of the NIC is thus available at all times to serve the other physical computing units.

Although these features and benefits of embodiments of the present invention are described, for the sake of concreteness and clarity, with specific reference to a switch, the principles of the present invention may similarly be applied in other sorts of network communication apparatus that perform packet queuing and forwarding functions, including (but not limited to) routers and bridges. Similarly, although the disclosed embodiments relate in particular to features of Ethernet and InfiniBand switch fabrics, the principles of the present invention may similarly be applied, mutatis mutandis, in packet networks of other types.

In the embodiments that are described hereinbelow, communication apparatus, such as a switch, comprises multiple ports configured to serve as ingress and egress ports, such that the ingress ports receive packets from a packet data network for forwarding to respective egress ports. At least one of the egress ports is configured for connection to a NIC that serves multiple physical computing units, which have different, respective destination addresses on the network and are connected to the NIC by different, respective communication channels. These destination addresses are used by other entities on the network in transmitting packets to the physical computing units and may comprise, for example, network-layer addresses, such as and Internet Protocol (IP) address or InfiniBand global identifier (GID), or link-layer addresses, such as a local identifier (LID) in an InfiniBand network or a medium access control (MAC) address in an Ethernet network.

Control and queuing logic in the apparatus takes advantage of these different destination addresses in separately queuing and controlling the rate of transmission of packets through the egress port to each of the physical computing units served by the NIC. In other words, the control and queuing logic queues the packets that are received from the packet data network for forwarding to the physical computing units in different, respective queues (referred to hereinbelow as "flow queues") according to the destination addresses. The control and queuing logic then arbitrates among the queues so as to convey the packets from all of these queues via the same egress port to the NIC, which distributes the packets to the physical computing units over the respective communication channels. The control and queuing logic is thus able to take the bandwidths of the individual communication channels into account in selecting the packets for transmission from the queues, and in this manner can maintain the rate of transmission of the packets through the egress port to each of the physical computing units at a level that is no greater than the bandwidth of the corresponding communication channel.

This awareness and separation of traffic in a switch (or other communication apparatus) among the destination computing units can also be useful in enhancing the efficiency and precision of congestion control and buffer use in the switch. For example, the control and queuing logic can monitor the respective lengths of the queues, and when the length of one of the queues exceeds a certain threshold, can apply a congestion control measure with respect to the specific destination address that is associated with the queue, such as dropping packets or sending a congestion notification back to the source of the packets. Additionally or alternatively, the control and queuing logic can allocate different, respective buffers in the switch for the packets in the different queues, and may also manage and adjust the buffer allocations depending on the lengths of the queues.

System Description

FIG. 1 is a block diagram that schematically illustrates a network communication system 20, in accordance with an embodiment of the invention. System 20 comprises multiple end-nodes 22, 24, 26, . . . , which are connected to a packet data network 28, such as an Ethernet or InfiniBand network, for example. Network 28 comprises a fabric of interconnected switches, which are loosely defined to include edge switches 30 and core switches 32, wherein the end-nodes are connected to respective edge switches. The term "switches," as used in the present patent application and in the claims, encompasses any and all suitable sorts of packet switching apparatus, including routers and bridges, for example. The network topology of FIG. 1 is shown solely for the purpose of illustrations, and the principles of the present invention may similarly be applied in packet networks of other types and topologies.

End-nodes 22, 24, 26, . . . , typically comprise one or more physical computing units, which are connected to network 28 by a NIC. In the pictured example, end-node 22 comprises a multi-host NIC 34, serving four physical computing units 36, which are sometimes referred to as "functions" and are therefore labeled F1 through F4. Each of these physical computing units 36 performs computing and communication functions in a manner independent of the other physical computing units and has its own address on network 28, such as an IP or link-layer address. The network interface of NIC 34 is connected by a communication link 38, such as an Ethernet or InfiniBand link, to one or more of the ports of switch 30. On the host side, NIC 34 is connected to physical computing units 36 by respective communication channels 40, such as PCIe buses or lanes (or groups of lanes) of a shared PCIe bus. It is assumed in the present example that the bandwidth of link 38 is greater than that of each of channels 40, although the aggregate bandwidth over all of channels 40 may be greater than, or at least equal to, that of link 38.

For the sake of simplicity, only a single multi-host end-node 22 is shown in FIG. 1, but in practice system 20 typically comprises multiple multi-host end nodes, which can be served by the respective switches 30 in the manner described hereinbelow. System 20 may also comprise single-host end-nodes, such as end-node 24, in which a NIC 42 serves a single host processor 44. NIC 42 is connected to switch 30 by a communication link 46, similar to link 38, and is connected to host processor 44 by a single communication channel 48.

Figure 2:
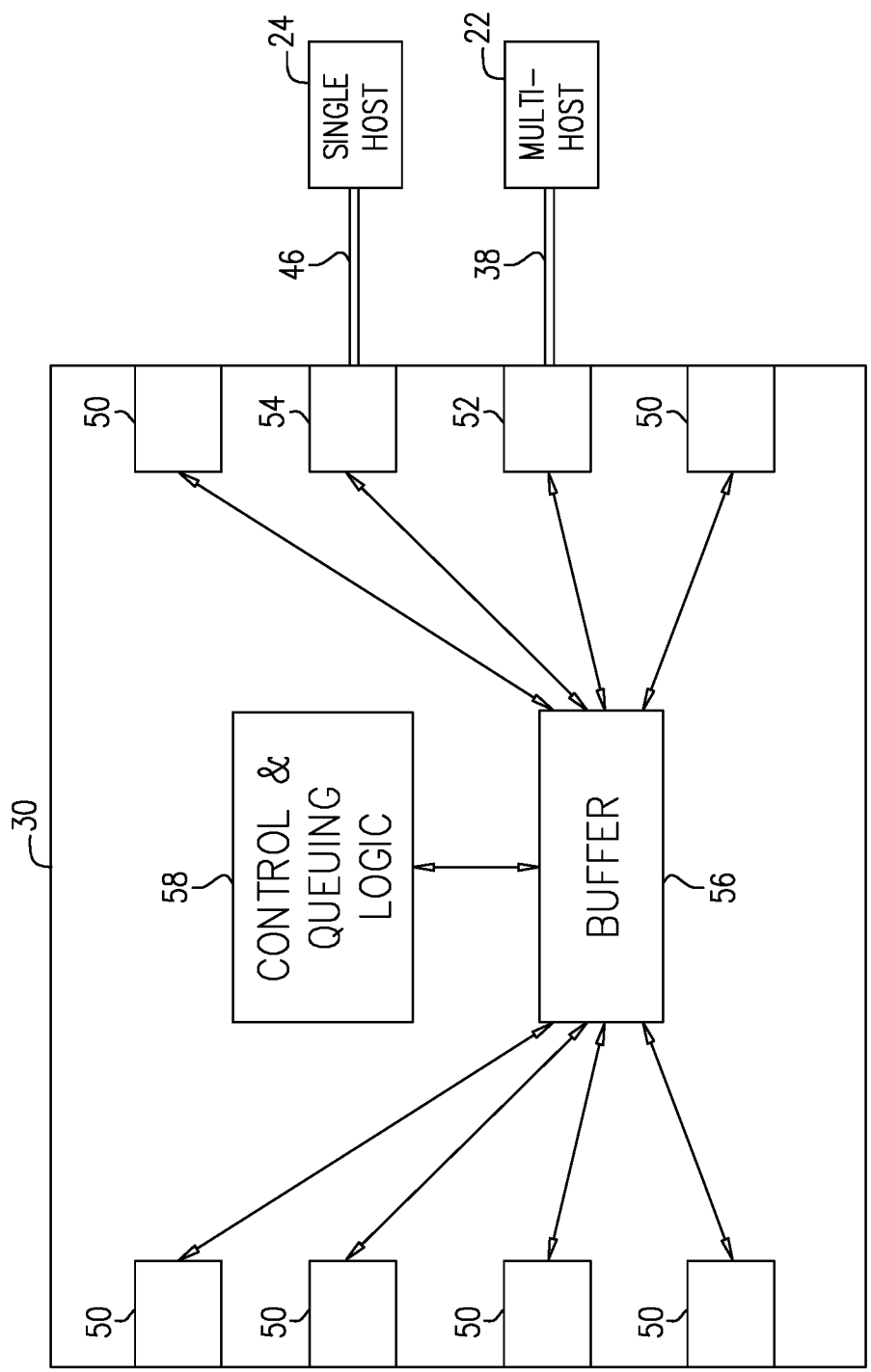
FIG. 2 is a block diagram that schematically illustrates a switch, in accordance with an embodiment of the invention.

FIG. 2 is a block diagram that schematically shows details of switch 30, in accordance with an embodiment of the invention. Switch 30 comprises multiple interfaces, in the form of ports 50 connected to packet data network 28, as well as ports 52 and 54, connected via communication links 38 and 46 to end-nodes 22 and 24, respectively. Ports 50, 52, 54 typically comprise suitable physical-layer (PHY) and data-link layer interface circuits, as are known in the art. Ports 50, 52 and 54 can serve as both ingress ports, which receive incoming packets, and egress ports, which transmit packets onward to their destinations.

Packets received by switch 30 through ports 50, 52, are typically held temporarily in buffers that are allocated in a memory 56. FIG. 2 shows memory 56, for the sake of simplicity, as a single physical block, which is shared among all the ports of switch 30. The memory may be allocated and redistributed flexibly among the ports and packet flows that are handled by switch 30, for example as described in U.S. Patent Application Publication 2017/0201469, whose disclosure is incorporated herein by reference. Alternatively or additionally, the memory in switch 30 that is used to hold packets may be divided among multiple separate physical blocks, some or all of which may be local to specific ports. Such port buffers may also be shared, for example as described in U.S. Pat. No. 8,644,140, whose disclosure is incorporated herein by reference.

Control and queuing logic 58 in switch 30 is responsible for queuing incoming packets that are received through ports 50, 52, 54 and forwarding the packets to the appropriate egress ports for onward transmission. The description that follows is concerned primarily with handling of packets received from network 28 through ports 50 for transmission via port 52 to multi-host end-node 22, and with queuing and buffering of such packets according to their respective destination addresses. Other functions of logic 58, as well as of switch 30 in general, are known in the art and are omitted here for the sake of brevity.

The configurations of switch 30 and system 20 that are shown in FIGS. 1 and 2 are example configurations, which are chosen purely for the sake of conceptual clarity. In alternative embodiments, any other suitable configurations of network and/or switching apparatus can be used. Control and queuing logic 58 in switch 30 typically comprises hard-wired or programmable logic circuits, such as one or more Application-Specific Integrated Circuits (ASICs) or Field-Programmable Gate Arrays (FPGAs). Alternatively or additionally, at least some of the functions of logic 58 may be implemented in software or firmware running on a programmable processor. All such implementations are considered to be within the scope of the present invention.

Packet Queuing and Transmission Rate Control

Figure 3:
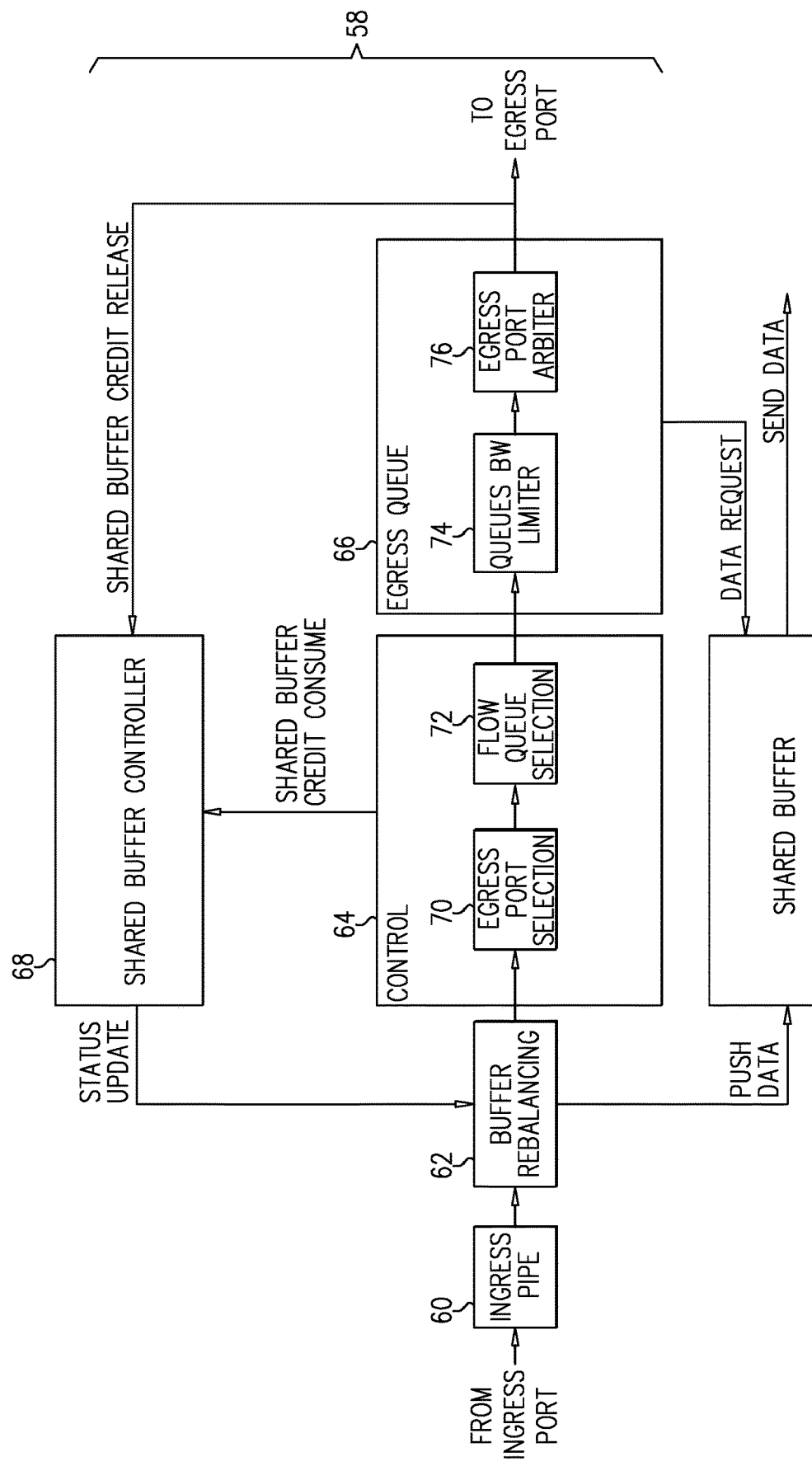
FIG. 3 is a block diagram that schematically shows details of control and queuing logic in a switch, in accordance with an embodiment of the invention.

FIG. 3 is a block diagram that schematically shows details of control and queuing logic 58 in switch 30, in accordance with an embodiment of the invention. Incoming packets received by the switch are initially processed by an ingress pipe 60, which performs admission control functions, as are known in the art. Logic in ingress pipe checks the packet headers and stores the packets temporarily in a dedicated ingress buffer (or discards the packets if they are malformed or the buffer is full, for example). Buffer rebalancing logic 62 performs physical rebalancing, as needed, among the separate ingress buffers. Alternatively, buffer rebalancing logic 62 may leave packets in the dedicated ingress buffer or drop packets if buffer occupancy has exceeded its limit.

Forwarding control logic 64 looks up the egress port and queue to which each packet should be assigned, based on packet header information, and then passes a corresponding packet descriptor to queuing logic 66, which is associated with the selected egress port and queues the descriptors for transmission. In order to handle packets that are directed to multi-host end-nodes, such as end-node 22, forwarding control logic 64 performs a two-stage lookup:

First, egress port selection logic 70 looks up the destination address of the packet, and possibly other packet header fields, for example in a forwarding table. This table indicates the egress port through which the packet should be transmitted, in a manner similar to forwarding tables that are known in the art (such as the linear forwarding table that is used in InfiniBand switches, for example), with the addition of a flag specifying whether or not the egress port is connected to a multi-host end-point. This flag, when set, indicates that the egress port is connected to a NIC serving multiple physical computing units, as explained above. If the flag is set for a given port (for example, port 52 in FIG. 2), the forwarding table will also contain a pointer to a flow queue selection table. The forwarding table may also indicate a service level for each packet. Alternatively or additionally, logic 70 may apply more complex port selection criteria, based on other routing, switching, tunnel-based forwarding, or policy-based switching criteria, for example.

Upon determining that a given packet is to be transmitted through an egress port serving a multi-host end node, such as port 52, flow queue selection logic 72 performs a second lookup on the destination address of the given packet in order to assign the given packet to a respective flow queue. Typically, each physical computing unit 36 (FIG. 1) has its own flow queue, and may have two or more flow queues, in which case other packet fields may be used in flow queue selection. For example, a single physical computing unit may have multiple flow queues for packets with different levels of service. Alternatively, some flow queues may be shared by two or more physical computing units. For egress ports that do not serve a multi-host end node, such as port 54, forwarding control logic 64 can skip over the functions of logic 72.

Figure 4:
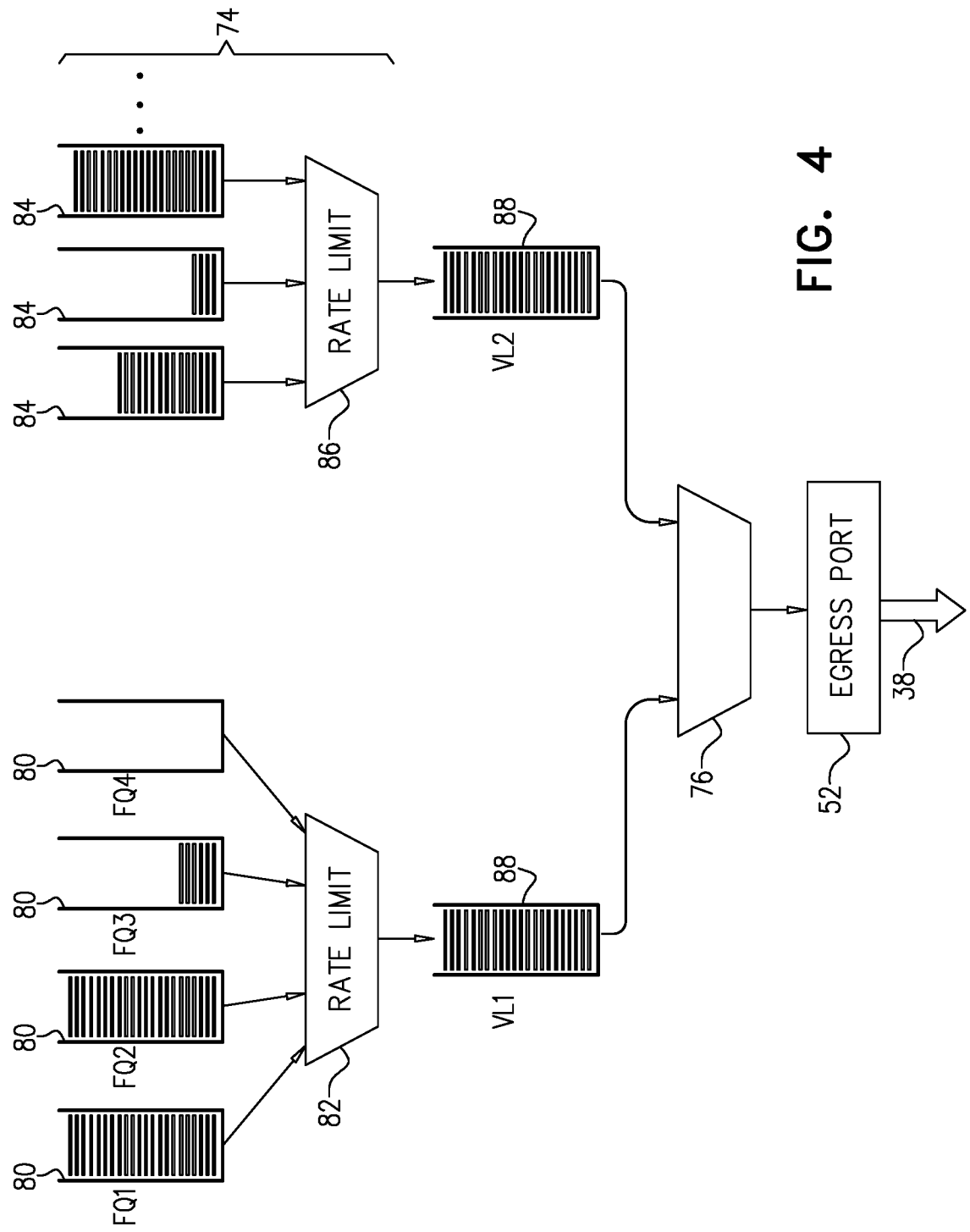
FIG. 4 is a block diagram that schematically shows queues maintained by a switch, in accordance with an embodiment of the invention.

Queuing logic 66 is typically configured to maintain multiple egress queues for each egress port, corresponding to respective virtual lanes or other service level differentiators. In addition, for ports serving multi-host end-nodes, such as port 52, queuing logic 66 maintains multiple flow queues, corresponding to the respective physical computing units 36. An example of this sort of queue organization is shown in FIG. 4 and is described below with reference thereto. Bandwidth control logic 74 limits the rate of packet transmission from each of the flow queues so as to maintain the rate of transmission of the packets through the egress port to the corresponding physical computing unit 36 at a level that is no greater than the bandwidth of the corresponding communication channel 40 between NIC 34 and the physical computing unit. In other words, even when a given flow queue is full of packets (possibly with a higher priority than other flow queues), bandwidth control logic 74 may release the packets from the given flow queue at a rate that is substantially less than the available bandwidth on port 52 and link 38, in order to avoid creating a bottleneck in the NIC. Bandwidth control logic 74 can be inactive in ports that do not serve multi-host end-nodes.

An egress port arbiter 76 passes the packets from the egress queues to the egress port in the manner that is known in the art. When a packet descriptor reaches the head of the egress queue and is selected by egress port arbiter 76, queuing logic 66 requests that the corresponding packet be retrieved from memory 56 and transmitted through the egress port.

FIG. 4 is a block diagram that schematically shows queues maintained by control and queuing logic 58 in switch 30, in accordance with an embodiment of the invention. Based on the destination addresses of the packets, as explained above, flow queue selection logic 72 assigns the packets to respective flow queues 80, 84. Each of flow queues 80 (labeled FQ1, FQ2, etc.) is directed to a corresponding physical computing unit 36. Flow queues 84 contain packets of a different service level from flow queues 80.

Bandwidth control logic 74 arbitrates among flow queues 80, 84, while applying one or more rate limiters 82, 86 in order to ensure that the average rate of transmission from the flow queues that are directed to a given physical computing unit 36 does not exceed the bandwidth of the corresponding communication channel 40. For example, the rate limiters may set a limit on the number of bytes transmitted from each flow queue 80, 84 in each of a succession of transmission periods, depending on the bandwidth of the corresponding communication channel, and may then terminate transmission from a give flow queue when it reaches its limit. For the remainder of the period, packets will be transmitted from other flow queues (until they reach their respective limits), or no packets will be transmitted at all.

The packets released from flow queues 80, 84 enter respective egress queues 88 (such as virtual lane queues in the case of an InfiniBand network, marked VL1 and VL2 in FIG. 4), depending on their respective service levels. Egress port arbiter 76 selects the packets from queues 88 for transmission via port 52 to link 38 in the usual manner.

Returning now to FIG. 3, control and queuing logic 58 also includes a shared buffer controller 68, which allocates different, respective buffers in memory 56 for the packets in the various egress queues of ports 50, 52, 54. When egress port arbiter 76 releases a packet for transmission, it notifies shared buffer controller 68 that the corresponding buffer space can be released, meaning that the queue in question gains additional "credit" in member 56. Shared buffer controller 68 can then push another packet into the allocated space in memory 56. Forwarding control logic 64 informs the shared buffer controller as the available credits are consumed by new incoming packets.

This buffer allocation and credit mechanism can be extended to the flow queues that are maintained by queuing logic 66 for the different physical computing units 36 in multi-host endpoint 22. In this case, shared buffer controller 68 will allocate different, respective buffers in memory 56 for the different flow queues, and will release space in the buffers as the corresponding packets are transmitted. Shared buffer controller 68 can monitor the respective lengths of the flow queues and may adjust the respective allocations of the buffers in memory 56 in response to the queue lengths. For example, when a given flow queue has used up its available buffer allocation, while other flow queues are relatively empty, shared buffer controller 68 may allocate additional buffer space to the given flow queue.

Additionally or alternatively, control and queuing logic 58 may apply congestion control measures with fine granularity to the individual flow queues. The control and queuing logic may be able in this manner to mitigate congestion due to traffic that is directed specifically to one of physical computing units 36, without deleterious effect on the traffic directed to the other physical computing units. In fact, reducing congestion that is associated with a particular physical computing unit may enhance the ability of switch 30 and network 28 to convey traffic at full speed to the other physical computing units in multi-host end-node 22.

For purposes of congestion control, control and queuing logic 58 monitors the respective lengths of the flow queues. When the length of one of the flow queues, corresponding to the destination address of one of the physical computing units, exceeds a certain threshold, control and queuing logic 58 applies congestion control measures with respect to this particular destination address. For example, if packet loss is permitted in network 28, one or more packets can be discarded from the flow queue in question. Additionally or alternatively, control and queuing logic 58 may transmit a congestion notification to a source of the packets that are directed to this address.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
multiple ports configured to serve as ingress and egress ports, such that the ingress ports receive packets from a packet data network for forwarding to respective egress ports, and the multiple ports include an egress port configured for connection to a network interface controller (NIC) serving multiple physical computing units, which have different, respective destination addresses and are connected to the NIC by different, respective communication channels having respective bandwidths; and
control and queuing logic, which is configured: to queue the packets that are received from the packet data network for forwarding to the multiple physical computing units in different, respective queues according to the respective destination addresses; to arbitrate among the queues so as to convey the packets from the queues via the same egress port to the NIC, for distribution to the multiple physical computing units over the respective communication channels; and to limit a rate of transmission of the packets from each of the queues via the egress port responsively to the respective bandwidths,
wherein the egress port has a first bandwidth, and a respective communication channel between the NIC and one of the physical computing units has a second bandwidth that is less than the first bandwidth, and the control and queuing logic is further configured to select the packets for transmission from the queues so as to maintain the rate of transmission of the packets through the egress port to the one of the physical computing units at a level that is no greater than the second bandwidth.

2. The apparatus according to claim 1, wherein the control and queuing logic is configured, upon receiving the packets from the ingress ports, to perform a first lookup on the destination addresses in order to select the respective egress ports through which the packets are to be transmitted, and upon determining that a given packet is to be transmitted through an egress port that is connected to the NIC serving the multiple physical computing units, to perform a second lookup on a destination address of the given packet in order to assign the given packet to a respective one of the queues.

3. The apparatus according to claim 1, wherein the different, respective destination addresses of the physical computing units are network-layer addresses.

4. The apparatus according to claim 1, wherein the different, respective destination addresses of the physical computing units are link-layer addresses.

5. The apparatus according to claim 1, wherein the control and queuing logic is configured to monitor respective lengths of the queues, and when a length of one of the queues corresponding to a given destination address of one of the physical computing units exceeds a predefined threshold, to apply a congestion control measure with respect to the given destination address.

6. The apparatus according to claim 1, and comprising a memory, which is coupled to store the packets received from the ingress ports while awaiting transmission through the egress ports, wherein the control and queuing logic is configured to allocate different, respective buffers in the memory for the packets in the different, respective queues that are destined for the multiple physical computing units.

7. The apparatus according to claim 6, wherein the control and queuing logic is configured to monitor respective lengths of the queues and to adjust respective allocations of the buffers in the memory responsively to the lengths of the queues.

8. A method for communication, comprising:
receiving from a packet data network, via ingress ports of a switch, packets for forwarding to respective egress ports, including an egress port connected to a network interface controller (NIC) serving multiple physical computing units, which have different, respective destination addresses and are connected to the NIC by different, respective communication channels having respective bandwidths;
queuing the packets that are received from the packet data network for forwarding to the multiple physical computing units in different, respective queues according to the destination addresses;
arbitrating among the queues so as to convey the packets from the queues via the same egress port to the NIC, for distribution to the multiple physical computing units over the respective communication channels, the arbitrating including limiting a rate of transmission of the packets from each of the queues via the egress port responsively to the respective bandwidths, wherein the egress port has a first bandwidth, and a respective communication channel between the NIC and one of the physical computing units has a second bandwidth that is less than the first bandwidth, and said limiting the rate of transmission comprises selecting the packets for transmission from the queues so as to maintain the rate of transmission of the packets through the egress port to the one of the physical computing units at a level that is no greater than the second bandwidth.

9. The method according to claim 8, wherein queuing the packets comprises, upon receiving the packets from the ingress ports, performing a first lookup on the destination addresses in order to select the respective egress ports through which the packets are to be transmitted, and upon determining that a given packet is to be transmitted through an egress port that is connected to the NIC serving the multiple physical computing units, performing a second lookup on a destination address of the given packet in order to assign the given packet to a respective one of the queues.

10. The method according to claim 8, wherein the different, respective destination addresses of the physical computing units are network-layer addresses.

11. The method according to claim 8, wherein the different, respective destination addresses of the physical computing units are link-layer addresses.

12. The method according to claim 8, and comprising monitoring respective lengths of the queues, and when a length of one of the queues corresponding to a given destination address of one of the physical computing units exceeds a predefined threshold, applying a congestion control measure with respect to the given destination address.

13. The method according to claim 8, and comprising storing the packets received from the ingress ports in a memory while awaiting transmission through the egress ports, and allocating different, respective buffers in the memory for the packets in the different, respective queues that are destined for the multiple physical computing units.

14. The method according to claim 13, wherein allocating the respective buffers comprises monitoring respective lengths of the queues and adjusting respective allocations of the buffers in the memory responsively to the lengths of the queues.

* * * * *